(No Model.) 2 Sheets—Sheet 1.
H. H. GORTER.
MOVABLE JOINT FOR WATER PIPES.
No. 580,084. Patented Apr. 6, 1897.
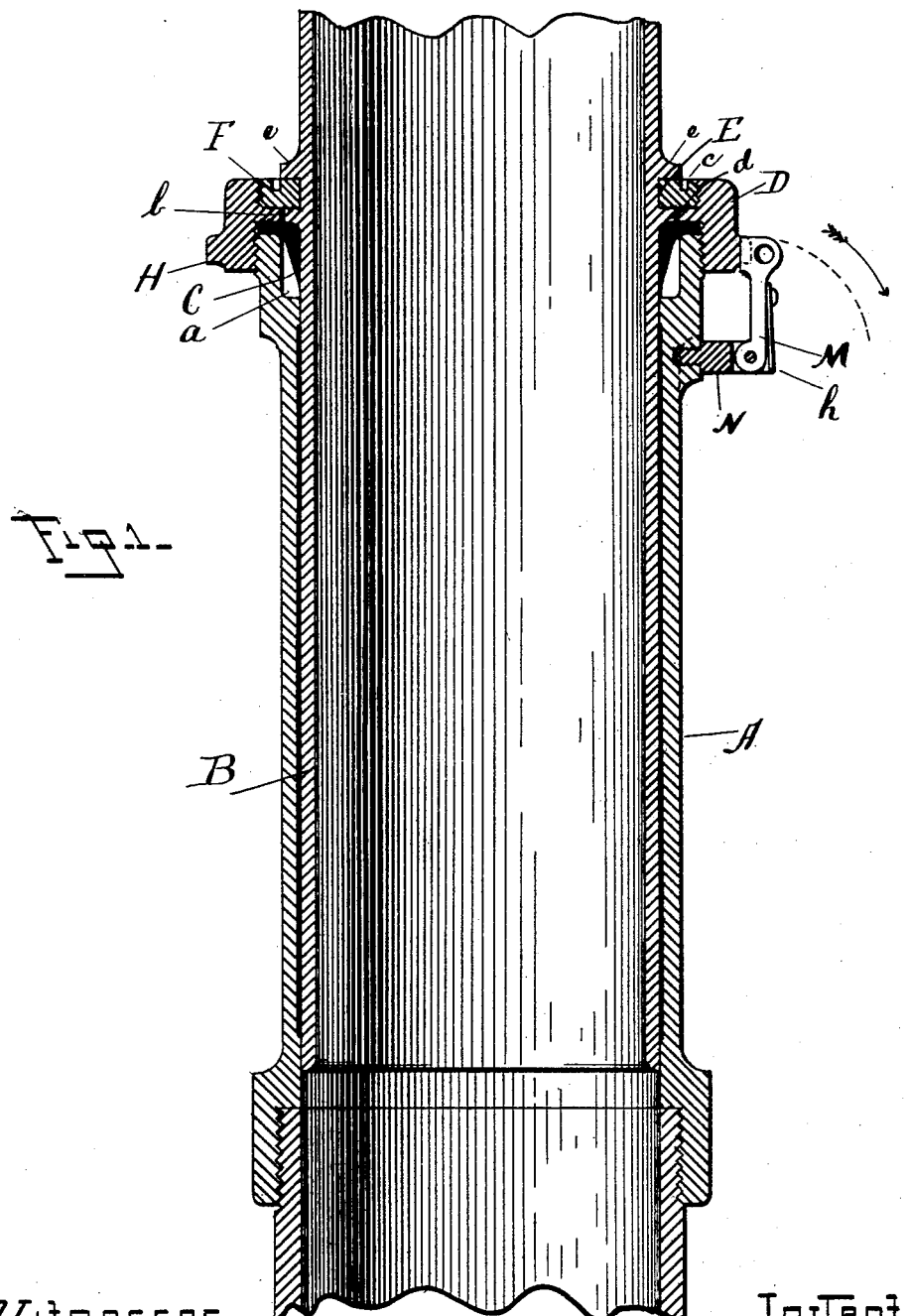
Witnesses
John D. Whaley
J. D. Haines
Inventor
Henry H. Gorter
per A. S. Pare
Attorney
THE NORRIS PETERS CO., PHOTO-LITHO., WASHINGTON, D. C.

(No Model.) 2 Sheets—Sheet 2.
H. H. GORTER.
MOVABLE JOINT FOR WATER PIPES.
No. 580,084. Patented Apr. 6, 1897.
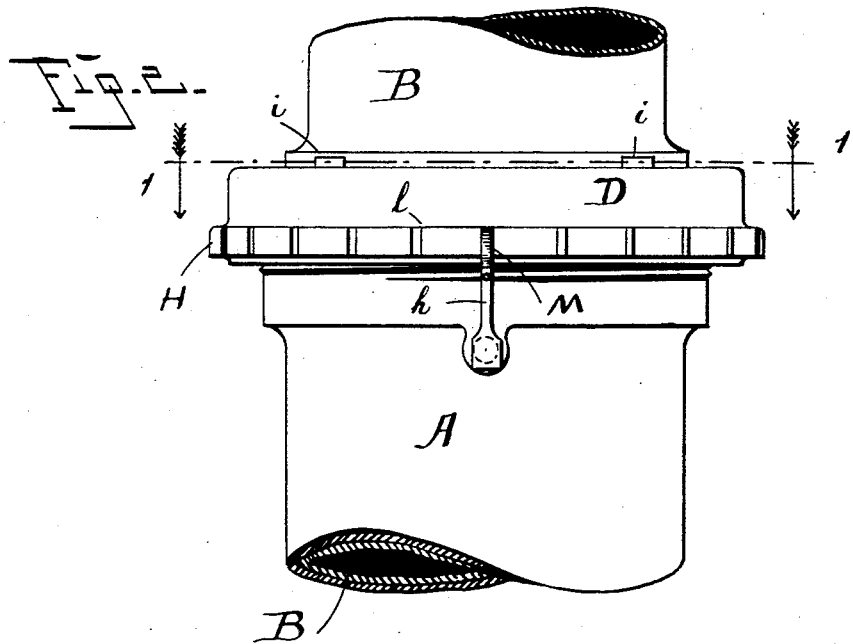
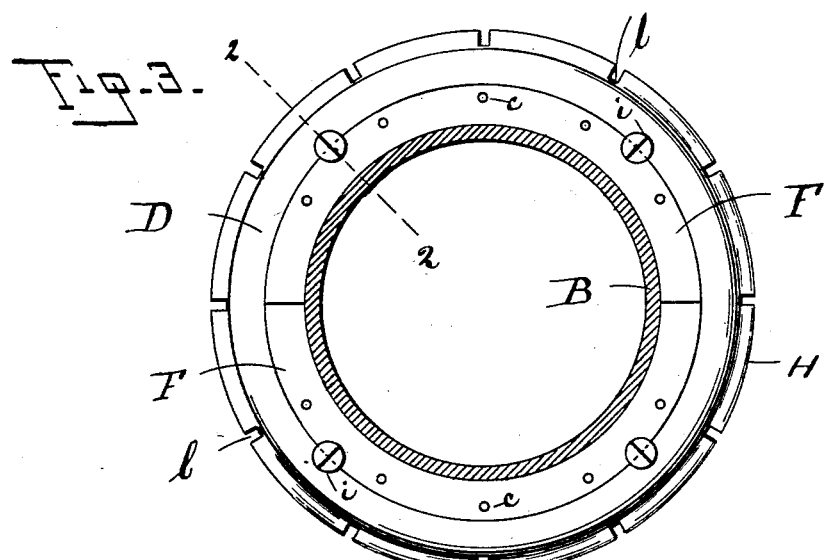
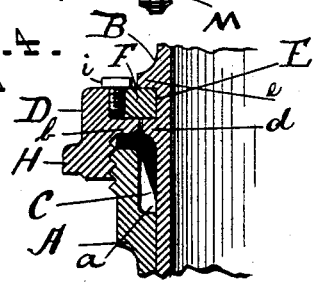
Witnesses
John D. Whaley
J. D. Haines
Inventor
Henry H. Gorter
per H. S. Paré
Attorney

UNITED STATES PATENT OFFICE.

HENRY H. GORTER, OF SAN FRANCISCO, CALIFORNIA.

MOVABLE JOINT FOR WATER-PIPES.

SPECIFICATION forming part of Letters Patent No. 580,084, dated April 6, 1897.

Application filed April 9, 1896. Serial No. 586,875. (No model.)

*To all whom it may concern:*

Be it known that I, HENRY H. GORTER, a citizen of the United States, residing in the city and county of San Francisco, State of California, have invented certain new and useful Improvements in Movable Joints for Water-Pipes; and I do hereby declare the following to be a full, clear, and exact description of said invention, such as will enable others skilled in the art to which it most nearly appertains to make, use, and practice the same.

My invention relates to improvements in that class of joints commonly called "swivel-joints," in which the outer and inner shells telescope together, and used particularly for fire or hydraulic mining apparatus where a swivel movement is required; and it consists in the novel construction and arrangement of the packing and retaining portion of the joint, whereby the swivel-section is safely secured to the stationary section and made water-tight.

Referring to the accompanying drawings, which form part of the following description, Figure 1 is a sectional view of my improved swivel-joint. Fig. 2 is a side elevation showing a portion of Fig. 1. Fig. 3 is a cross-section of Fig. 2, taken from dotted line 1 to 1, looking in the direction of the arrows; and Fig. 4 is a broken section of Fig. 3, taken from dotted line 2 to 2.

Similar letters refer to similar parts throughout the drawings.

Let A represent the stationary section of the joint, to which the main hose or pipe is connected. B is the swivel-section telescoped and adjusted within the stationary section, to which the discharge-pipe is connected, or vice versa. In the space $a$ between these two sections I insert the packing C, preferably made of leather and cut angularly, leaving a space between the stationary section and the packing, so that the water passing between the two sections forces the packing laterally against the swivel-section and causes it to make a still tighter joint. The other end of the packing is bent rectangularly and rests upon the edge of the stationary section. A nut D, provided with an internal shoulder $b$, is then screwed to the stationary section until the shoulder compresses the rectangular part of the packing against the edge of the stationary section, thus making a double water-tight joint. Upon the swivel-section and placed in an annular groove E is a ring F, having its outer side threaded to engage with the threads of the nut D for the purpose of keeping the swivel-section in position. This ring is made in two parts, as shown in Fig. 3, and provided with keyholes $c$, as shown in Figs. 1 and 3, to facilitate its adjustment. The sides of the groove project outwardly, as at $d\ e$, to form suitable bearing for the ring. Thus constructed and when in position the underneath edge of the ring bears tightly against the internal shoulder $b$ of the nut, while the projecting sides $d\ e$ of the groove prevent the swivel-section from moving up or down without interfering with its rotary movement.

To prevent the unscrewing of the ring while in position, I insert between its threaded edge and the nut a stopper consisting, preferably, of one or more screws $i$, as particularly shown in Figs. 3 and 4.

The nut D may be provided also with a stopper, if desired. For that purpose I have shown the nut with flange H and notches $l$ upon it to receive the key or pawl M. The pawl is pivoted to post N, secured to the stationary section, and provided with a spring $h$, working against the post, for the purpose of keeping the pawl in position when once set in the notches or released.

Thus believing I have produced valuable improvements in this class of joints and having described the same, what I do claim as my invention, and desire to secure by United States Letters Patent, is—

1. In a swivel-joint, the combination of the stationary section provided with means for attachment to a main at one end and with an internal annular groove at the other end, a swivel-section projecting within said stationary section, a shoulder on said swivel-section, a ring adjacent said shoulders having an external screw-thread, a nut having a screw-thread adapted to said screw-thread on the ring, a second screw-thread on the nut adapted to a screw-thread on the stationary section, and a flange between said threads, and a packing-ring lying in said annular groove and provided with a portion adapted to be held in place between the end of the stationary section and the flange on the nut, substantially as described.

2. In a swivel-joint, the combination of a stationary section provided at one end with means for attachment to a main, and at the other end with an annular groove, a swivel-section projecting into said stationary section, flanges on said swivel-section, a ring between said flanges formed in sections and provided with an external screw-thread, a nut provided with screw-threads for connection with said stationary section and said ring, a flange on the nut registering with one of the flanges on the swivel-section and forming with the stationary and swivel sections an annular space $a$, and a packing-ring in said space held between said flange and the stationary section, substantially as described.

In testimony whereof I have hereunto signed my name in the presence of two witnesses.

HENRY H. GORTER.

Witnesses:
CHAS. J. ARMBRUSTER,
JOHN D. WHALEY.